Figure 1:
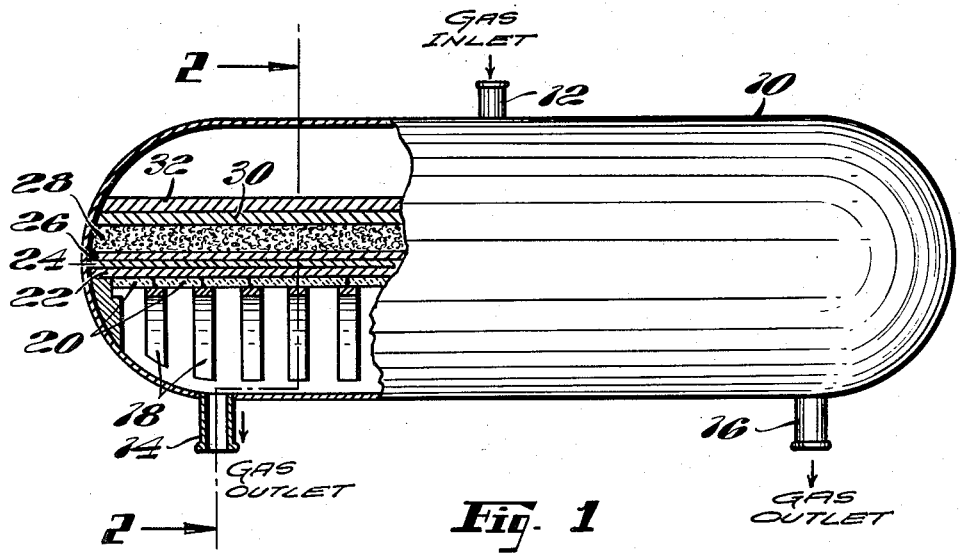

Aug. 11, 1959 G. D. MILLER 2,899,286
CATALYST BED SUPPORT
Filed Oct. 31, 1957

INVENTOR.
GUY D. MILLER
BY
Hayfla & Praul

United States Patent Office 2,899,286
Patented Aug. 11, 1959

2,899,286

CATALYST BED SUPPORT

Guy D. Miller, Pasadena, Tex.

Application October 31, 1957, Serial No. 693,739

2 Claims. (Cl. 23—288)

This invention relates to apparatus for the carrying out of catalytic reactions and more particularly to an improved catalyst support therefor.

Many types of reactions are carried out commercially in the presence of various types of catalysts. For example, in the reforming of hydrocarbons, metal oxide catalysts in the form of small solid cylinders or spheres are maintained as a bed within the reaction chamber. The hydrocarbon or other chemical being reacted flows through the bed, usually in a downward direction, the product being withdrawn from the bottom of the reactor. Decomposition products tend to adhere to the elements in the catalyst bed and must be burned off from time to time.

In order to provide good permeability of the catalyst bed so as to not unduly restrict flow through the bed and to also hold the catalyst firmly in position in the bed several layers of refractory balls of different size may be provided both below and above the catalyst layer. The lowermost layer of supporting balls are disposed as a bed on perforated refractory tile supported in the lower area of the reactor. A typical catalyst bed may thus consist, in ascending order, of a supporting arch, a layer of rider tile, a layer of perforated bed support tile, a shallow layer of suitably sized refractory balls, a shallow layer of smaller refractory balls, a deep layer of catalyst, another shallow layer of small balls and a top shallow layer of larger balls. Appropriate openings are, of course, provided through the arch and rider tile to permit flow of gases completely through the reaction bed.

Heretofore, the top layer of tile has simply been perforated. A serious difficulty has thus been encountered when flow of reactants is downward through the bed from plugging of the perforation passages by the layer of refractory balls resting on the openings in the tile. In effect, these balls serve as check valves seriously impeding the flow of reaction products from the bed.

It is the principal object of my invention to provide a novel catalyst bed supporting element for incorporation in a downflow catalytic reactor.

Yet a further object of the present invention is to provide a catalyst bed support which acts to support the catalyst thereon, but in spaced relation to the openings through the support so as to not impede the flow of products through the catalyst and the support bed therefor.

Yet a further object is to provide an element for use in a reactor to support a catalyst in a manner to increase the efficiency of the catalyst.

Still another object is to provide a support for a catalyst in a reactor which is constructed to not inhibit the flow of reactants through the reactor.

According to my invention I provide a gas permeable floor for the catalyst bed composed of refractory blocks or tiles perforated with a multiplicity of passages and having channels or grooves running along the top of each row of passages. The grooves are so dimensioned that the refractory supporting balls will be held well above the inlet to each perforation in the tiles and hence will not cause any blockage whatsoever. As a result of my invention, for the first time it has been possible to conduct continuous catalytic reaction for the full period of the cycle without altering the pressure drop in any degree by reason of blockage of the passages through the tiles by the balls.

Figure 3:
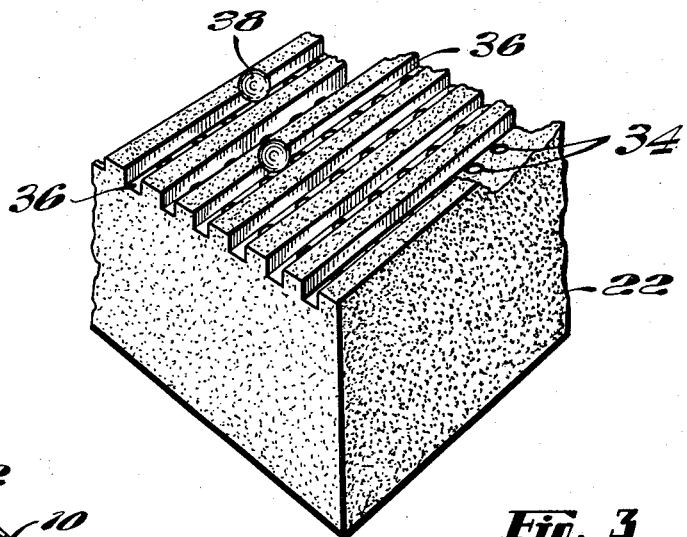
Figure 2:
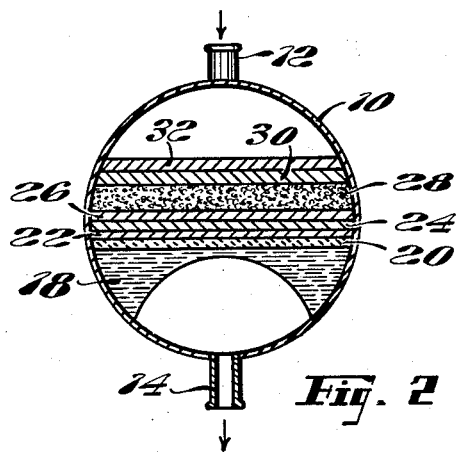

My invention will better be understood and appreciated from the following description thereof taken in connection with the accompanying drawings in which Fig. 1 is a side view partly in vertical cross section of a typical catalytic reactor;

Fig. 2 is a sectional end view of the reactor taken along line 2—2 of Fig. 1; and Fig. 3 is an enlarged perspective view of a single tile.

In Fig. 1 the reactor 10 is illustrated as a horizontally disposed chamber of greater length than height. It is preferably cylindrical in shape with spherical ends but various other configurations may be employed in fashion well known in the art. A gaseous feed inlet 12 is provided in the top and gaseous product outlets 14 and 16 in the bottom. Various other conduits may be connected into the reactor at other points as desired.

Within reactor 10 is a row of refractory arches 18 disposed along the length of the reactor. Resting on their edges on the arches are rows of rider tiles 20 which support the perforated and grooved bed support tiles 22 of this invention. Lying on the support tiles 22 is a layer 24 of ½" refractory balls above which is another layer 26 of ¼" refractory balls. Above these is the catalyst bed 28, then another layer 30 of ¼" balls and finally a layer 32 of ½" balls. The thickness of the various layers will vary in different operations. Typically for butylene production from butane each layer of refractory balls will be approximately 3" thick and the catalyst bed will be 30"–36" thick. The catalyst itself, which may be a chrome-alumina solid, is usually in the form of small pills or cylinders approximately ⅛" in diameter. The sizes of the balls specified above are typical for catalytic reactions but may be varied to suit various different conditions.

The supporting tile provided by this invention is shown in detail in Fig. 3. As there shown the tile, which is but one of many in the reactor, consists of a refractory block extensively perforated over its complete area wtih cylindrical passages 34. Along each row of passages 34 a shallow groove 36 is provided which groove is sufficiently smaller than the refractory balls 38 (a few being shown in place) to prevent the balls from blocking the passages 34 through the block. Thus, no matter what the disposition of the balls over the horizontal surface of the tile layer 22, none of the passages 34 will be blocked and the entire catalyst supporting assembly will be fully permeable during the on stream cycle. Consequently, the reactor can be operated for longer periods of time than has been possible heretofore before deposition of carbonaceous material in the reaction zone requires burnout in the usual manner.

It will be appreciated that this invention eliminates a problem which has existed for many years. Before this invention bed support balls had to be made to very rigid size specifications and even then a considerable number of the tile passages were inevitably blocked thus rendering ineffective an important amount of area of the reactor.

A typical single tile constructed according to this invention had passages 34 ¼" in diameter and grooves 36 ⅛" wide and 5/32" deep. Of course, the width and depth of grooves 36 will vary depending upon the size of refractory balls 38 to be supported thereon, and the foregoing is given by way of example only.

Broadly the invention relates to a catalyst bed support and more particularly to a perforated block which has grooves connecting the openings or perforations in the block so as to support refractory balls upon the tile in an elevated position relative to the openings or perforations through the block so as to not impede the flow of gas through the tile and catalyst bed in which the support is used.

What is claimed is:

1. A catalytic reactor having an inlet and an outlet for the flow of reactants, at least one refractory tile, a layer of refractory balls supported on said tile, a catalyst bed supported by said balls, fixed supports supporting said tile in position in the reactor, grooves in said tile upon which the refractory balls are supported, openings through said tile terminating in said grooves for the flow of reactants in the reactor from the inlet to the outlet, the width of said grooves in relation to their depth being such that the balls are supported above said openings in said tile whereby reactants flow unrestricted through said openings and layer of refractory balls.

2. A catalytic reactor having an inlet and an outlet for the flow of reactants wherein a catalyst bed is supported on a layer of balls, the improvement comprising, a refractory tile for supporting the balls, grooves in said tile upon which the refractory balls are supported, openings through said tile terminating in said grooves for the flow of reactants in the reactor from the inlet to the outlet, the width of said grooves in relation to their depth being such that the balls are supported above said openings in said tile whereby reactants flow unrestricted through said openings and layer of refractory balls.

References Cited in the file of this patent

UNITED STATES PATENTS

| | | |
|---|---|---|
| 2,742,437 | Houdry | Apr. 17, 1956 |
| 2,782,107 | Inman | Feb. 19, 1957 |